United States Patent
Calcaterra et al.

(10) Patent No.: US 11,801,462 B2
(45) Date of Patent: Oct. 31, 2023

(54) FILTER ELEMENT HAVING FLOW DIRECTING TUBE AND STANDPIPE AND FILTER SYSTEMS INCLUDING THE FILTER ELEMENT

(71) Applicants: Farrell Calcaterra, Kearney, NE (US); Jonathan D. Moore, Ellington, CT (US); Tetyana V. Gilbert, Columbia, TN (US); Michael J. Von Seggern, Kearney, NE (US)

(72) Inventors: Farrell Calcaterra, Kearney, NE (US); Jonathan D. Moore, Ellington, CT (US); Tetyana V. Gilbert, Columbia, TN (US); Michael J. Von Seggern, Kearney, NE (US)

(73) Assignee: Baldwin Filters, Inc., Cleveland, OH (US)

( * ) Notice: Subject to any disclaimer, the term of this patent is extended or adjusted under 35 U.S.C. 154(b) by 0 days.

(21) Appl. No.: 18/309,955

(22) Filed: May 1, 2023

(65) Prior Publication Data
US 2023/0264122 A1    Aug. 24, 2023

Related U.S. Application Data

(63) Continuation of application No. PCT/US2021/059666, filed on Nov. 17, 2021.

(60) Provisional application No. 63/279,415, filed on Nov. 15, 2021, provisional application No. 63/115,071, filed on Nov. 18, 2020.

(51) Int. Cl.
*B01D 29/23* (2006.01)
*B01D 36/00* (2006.01)

(52) U.S. Cl.
CPC ......... *B01D 29/232* (2013.01); *B01D 36/006* (2013.01); *B01D 2201/12* (2013.01); *B01D 2201/302* (2013.01); *B01D 2201/316* (2013.01)

(58) Field of Classification Search
CPC ........ B01D 27/07; B01D 27/08; B01D 29/23; B01D 29/232; B01D 2201/12; B01D 2201/302; B01D 2201/316; B01D 2201/325
See application file for complete search history.

(56) References Cited

U.S. PATENT DOCUMENTS

| | | | |
|---|---|---|---|
| 4,626,348 A | 12/1986 | Stone | |
| 6,881,328 B2 | 4/2005 | Dittmann et al. | |
| 10,569,226 B2 | 2/2020 | Lim et al. | |
| 2013/0068702 A1* | 3/2013 | Allen | B01D 35/005 210/232 |

(Continued)

FOREIGN PATENT DOCUMENTS

| | | |
|---|---|---|
| AU | 2011352044 B2 | 7/2012 |
| CA | 2945160 A1 | 4/2017 |

(Continued)

*Primary Examiner* — Benjamin M Kurtz
(74) *Attorney, Agent, or Firm* — Reinhart Boerner Van Deuren P.C.

(57) ABSTRACT

Filter elements and filter systems are provided. The filter element allows for a reversed flow of fluid through the filter element when flowing from a first port to a second port of a filter head of the filter system. The filter element includes a standpipe in a central cavity of a tube of filter media that is fluidly connected with an exterior of the tube of filter media by a radial flow conduit and an axial flow tube.

23 Claims, 6 Drawing Sheets

(56) References Cited

U.S. PATENT DOCUMENTS

2017/0144091 A1    5/2017    Wolhowe

FOREIGN PATENT DOCUMENTS

| CN | 104500296 B | 2/2017 |
| CN | 106898795 B | 5/2019 |
| ES | 2285520 T3 | 11/2007 |
| JP | 2016516572 A | 6/2016 |
| WO | WO 2017/213618 A1 | 12/2017 |

* cited by examiner

FILTER ELEMENT HAVING FLOW DIRECTING TUBE AND STANDPIPE AND FILTER SYSTEMS INCLUDING THE FILTER ELEMENT

CROSS-REFERENCE TO RELATED PATENT APPLICATIONS

This patent application is a continuation of International Application No. PCT/US2021/059666, filed Nov. 17, 2021, which claims the benefit of U.S. Provisional Patent Application No. 63/115,071, filed Nov. 18, 2020, and also claims the benefit of U.S. Provisional Patent Application No. 63/279,415, filed Nov. 15, 2021. The entire teachings and disclosure of each application is incorporated herein by reference thereto.

FIELD OF THE INVENTION

The present disclosure relates to fuel filtration, and more particularly to filter elements and particularly flow reversal of fluid flow.

BACKGROUND OF THE INVENTION

Filter systems are used to remove impurities from fluids. The filter system often includes a replaceable filter element that can be replaced once the filter element has reached the end of its serviceable life.

In some filter systems, the filter system will include a filter head that has a dirty fluid inlet and a clean fluid outlet. The filter element will have a tube of filter media through which the fluid flows in a radial direction as it is being filtered. The flow of fluid may be either radially inward or radially outward depending on how the filter element interacts with the dirty fluid inlet and clean fluid outlet.

One such situation where filter systems are used is for filtering fuel where particulates as well as entrained water is often removed from the fuel prior to flowing to a downstream system such as an internal combustion engine. The filter element often uses a tube of filter media and as the fluid flows through the filter media particulates are removed.

Water may be removed from the fuel either being stripped from the fuel prior to the fuel passing through the filter media or coalesced after flowing through the filter media. Typically, the removed water will then flow to a water bowl where it is stored until the maintenance interval and/or it is evacuated from the filter system, such as back to the fuel storage tank.

Because stripping and coalescing result in the removed water being on opposite sides of the filter media (e.g. upstream—stripping or downstream—coalescing), it is often not possible to switch between a stripping filter element and a coalescing filter element because the removed water will end up on opposite sides of the filter media with all else being equal. Instead, it may be necessary to reverse the flow of fluid through the filter media when switching between the different water removal options.

In addition to changes in water removal techniques, there may be other reasons for switching the direction of fluid flow through a filter element when using a same filter head.

For example, modern diesel fuel filtration applications require different mechanisms for water removal depending on fuel quality and flow rate. For fuels with higher IFT (interfacial tension) and low flow rates, water stripping filter designs work adequately. For lower IFT and higher flow rates, coalescing filter designs must be used.

In order to design a fuel filtration system for multiple applications, it may also be necessary to change the direction of the fuel flowing through the filter from outside-in to inside-out, or vise-versa. This allows for water stripping or coalescing by simply changing the element used. The head, housing and bowl can be used regardless of the flow of fluid through the filter element.

Attempts have been made to redirect flow through a tube of filter media using modular endcaps. This has resulted in complex structures for assembly. Some examples of such attempts to change the direction of flow include U.S. Pat. Nos. 9,789,426 and 10,722,826.

BRIEF SUMMARY OF THE INVENTION

New filter systems and filter elements are provided.

In one example, a filter element including a tube of filter media, top and bottom end caps, a standpipe, an axial flow tube, and a radial flow conduit is provided. The tube of filter media circumscribes a central axis and defines a central chamber. The tube of filter media extends along the central axis between a top end and a bottom end. The top end cap is secured to the top end of the tube of filter media and has a first opening. The bottom end cap is secured to the bottom end of the tube of filter media. The standpipe is located within the tube of filter media and defines a standpipe flow path having a standpipe port proximate the top end cap. A fluid chamber is formed between an exterior of the standpipe and an interior of the tube of filter media. The fluid chamber forms part of the central chamber. A fluid chamber port is defined between the top end cap and the standpipe. The axial flow tube has a first flow tube port positioned fluidly exteriorly of the central chamber. The axial flow tube defines a flow tube flow path extending from the first flow tube port axially towards the bottom end cap for fluid flow generally parallel to the central axis. Flow can be either towards or away from the bottom end cap depending on the configuration of the element and/or filter system in which it is utilized. The radial flow conduit defines a radial flow path radially fluidly connecting the flow tube flow path with the standpipe flow path at a location closer to the bottom end cap than the top end cap.

In one example, the first flow tube port is positioned axially closer to the top end of the tube of filter media than the bottom end of the tube of filter media.

In one example, a filter element flow path is defined from the fluid chamber port to the stand pipe port, the filter element flow path extends from the fluid chamber port, into the fluid chamber, radially through the filter media to the exterior of the tube of filter media, into the first flow tube port, through the flow tube flow path towards the bottom end cap, radially through the radial flow path, into the standpipe flow path, and axially towards the top end cap to the standpipe port.

In one example, the stand pipe extends axially through the first opening of the top end cap such that the standpipe port is external of the central chamber of the tube of filter media and axially offset from the tube of filter media.

In one example, the standpipe port has a standpipe port diameter that is larger than a first opening diameter of the first opening of the top end cap. As such, fluid flowing from the fluid chamber port to the fluid chamber flows radially toward the central axis and fluid flowing from the fluid chamber toward the fluid chamber port flows radially away from the central axis.

In one example, the tube of filter media comprises a ring of pleated filter media, the exterior axial flow tube is located between adjacent pleats of the tube of filter media.

In one example, the tube of filter media generally comprises a section of pleated filter media folded around the central axis to form the tube of filter media such that opposed first and second sides of the section of pleated filter media are proximate one another. The axial flow tube is positioned angularly between the opposed first and second sides of the section of pleated filter media to form the tube of filter media.

The section of pleated filter media could be in the form of a flat panel of filter media that is subsequently folded around the central axis.

In one example, the first and second sides of the section of pleated filter media are secured to the axial flow tube.

In one example, the axial flow tube includes first and second clips on opposed sides of the axial flow tube. The first clip engages a first pleat panel of the pleated filter media proximate the first side of the section of filter media. The second clip engages a second pleat panel of the pleated filter media proximate the second side of the section of filter media.

In one example, the axial flow tube is an elongated wedge shape. The wedge shape tapers outwardly from a narrower radial inner end toward a broader radially outer end. The radially inner end is closer to the central axis than the radially outer end.

In one example, the axial flow tube has a molded body defining the flow tube flow path. The first and second clips each have a portion embedded in the molded body and a tab portion extending outward from the molded body. The tab portion of each clip engaging the filter media.

In one example, the bottom end cap is adhesively secured to the tube of filter media, the axial flow tube and the standpipe.

In one example, the tube of filter media is formed from pleated filter media. Adjacent pleat panels form voids therebetween. A cross-sectional area of the flow tube flow path orthogonal to the central axis is greater than a cross-sectional area of the voids orthogonal to the central axis.

In some examples, the cross-sectional area of the voids could be substantially nonexistent if the adjacent plate panels are angularly pressed against one another.

In one example, the radial flow conduit and the axial flow tube are formed from a single continuous body and a seal member seals the radial flow conduit to the standpipe.

In one example, the continuous body defining the radial flow conduit and the axial flow tube includes an annular member that extends around an outer periphery of the standpipe proximate the bottom end cap.

In one example, the standpipe, radial flow conduit and the axial flow tube are formed from a single continuous body.

In one example, the bottom end cap bounds, at least in part, the radial flow conduit as the radial flow conduit extends radially between the standpipe and the axial flow tube.

In one example, fluid flow between an exterior of the tube of filter media and the standpipe does not pass through the filter media of the tube of filter media.

In example, a filter system including a filter head, a filter element housing, and a filter element as outlined above. The filter head defines a dirty fluid inlet and a clean fluid outlet. The filter head has a filter element mounting arrangement. The filter element is within the filter element housing. The filter element and filter element housing are mounted to the filter head with the fluid chamber port fluidly connected to the dirty fluid inlet or the clean fluid outlet and the standpipe port fluidly connected to the other one of the clean fluid outlet or the dirty fluid inlet. The filter element housing and an exterior of the tube of filter media define a second fluid chamber exterior of the tube of filter media in direct fluid communication with the axial first flow tube port.

In one example, both dirty fluid flowing from the filter head flowing through the dirty fluid inlet and clean fluid flowing into the filter head from the filter element pass through the first opening in the filter element.

In one example, dirty fluid within the central chamber of the tube of filter media is separated from clean fluid within the central chamber by the standpipe.

In one example, the dirty fluid inlet is connected to the fluid chamber port upstream of the filter media and the clean fluid outlet is connected to the standpipe port downstream from the filter media such that dirty fluid flows into the fluid chamber prior to passing through the filter media and clean fluid flows into the standpipe after flowing through the second fluid chamber, axial flow tube, and the radial flow conduit.

In one embodiment, the dirty fluid inlet circumscribes the clean fluid outlet.

In an example, a filter system including a filter head, a filter element housing and a filter element is provided. The filter head defines a first port and a second port. The filter head has a filter element mounting arrangement, which could be threading, catches, latches, tabs, etc. The filter element is located within the filter element housing. The filter element and filter element housing are mounted to the filter head with the fluid chamber port fluidly connected to the first or second port and the standpipe port fluidly connected to the other one of the first or second port. The filter element housing and an exterior of the tube of filter media define a second fluid chamber exterior of the tube of filter media in direct fluid communication with the axial first flow tube port.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Figure 1:
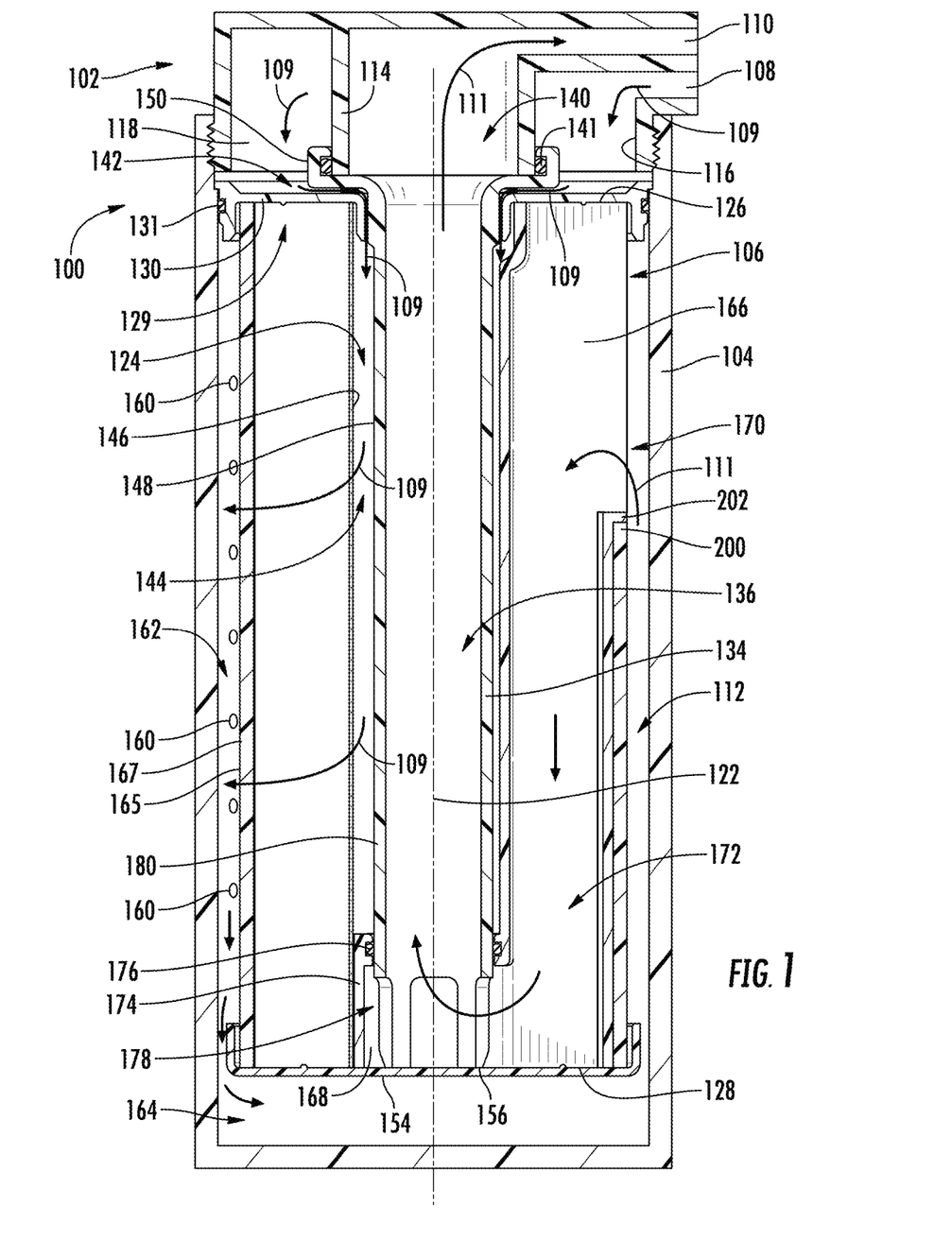
FIG. 1 is a cross-sectional illustration of a filter system according to an example of the disclosure.

FIG. 1 illustrates a filter system 100 that includes a filter head 102, a filter housing 104 and a filter element 106. The filter element 106 is located within the filter housing 104. The filter element 106 and filter housing 104 are removably attachable to the filter head 102.

The filter head 102 has a dirty fluid inlet 108 and a clean fluid outlet 110 that are fluidly separated from one another. Dirty fluid 109 (represented by arrows 109) enters the filter system 100 through the dirty fluid inlet 108, flows through the filter element 106 where it is filtered and then exits the filter system 100 through the clean fluid outlet 110 as clean fluid 111 (represented by arrows 111). Dirty fluid 109 may also be referred to as "wet" fluid while clean fluid 111 may also be referred to as "dry" fluid.

In this example, the filter housing 104 is reusable such that at maintenance intervals only the filter element 106 is replaced. However, in other examples, the filter housing 104 and filter element 106 can be a one-time use assembly where the filter element 106 is permanently secured within the filter housing 104. In such an example, both the filter housing 104 and the filter element 106 are replaced at maintenance intervals. The enter assembly would be removable as a single unit from the filter head 102.

The filter housing 104 is attached to the filter head 102 with the filter element 106 secured within a cavity 112 of the filter housing 104. Mounting structure, such as cooperating threads, secures the filter housing 104 to the filter head 102. While not illustrated, a seal may be provided between the filter housing 104 and filter head 102 to avoid fluid leakage therebetween. In the illustrated configuration, this would prevent leakage of dirty fluid 109.

The filter head 102 includes an inner annular wall 114 that forms part of or is otherwise connected to the clean fluid outlet 110. The filter head also includes an outer annular wall 116. A chamber 118 formed between the inner annular wall 114 and the outer annular wall 116 forms part of or is otherwise connected to the dirty fluid inlet 108. The inner annular wall 114 fluidly separates the clean fluid flow 111 therethrough from the chamber 118 and the associated dirty fluid flow 109.

Figure 2:
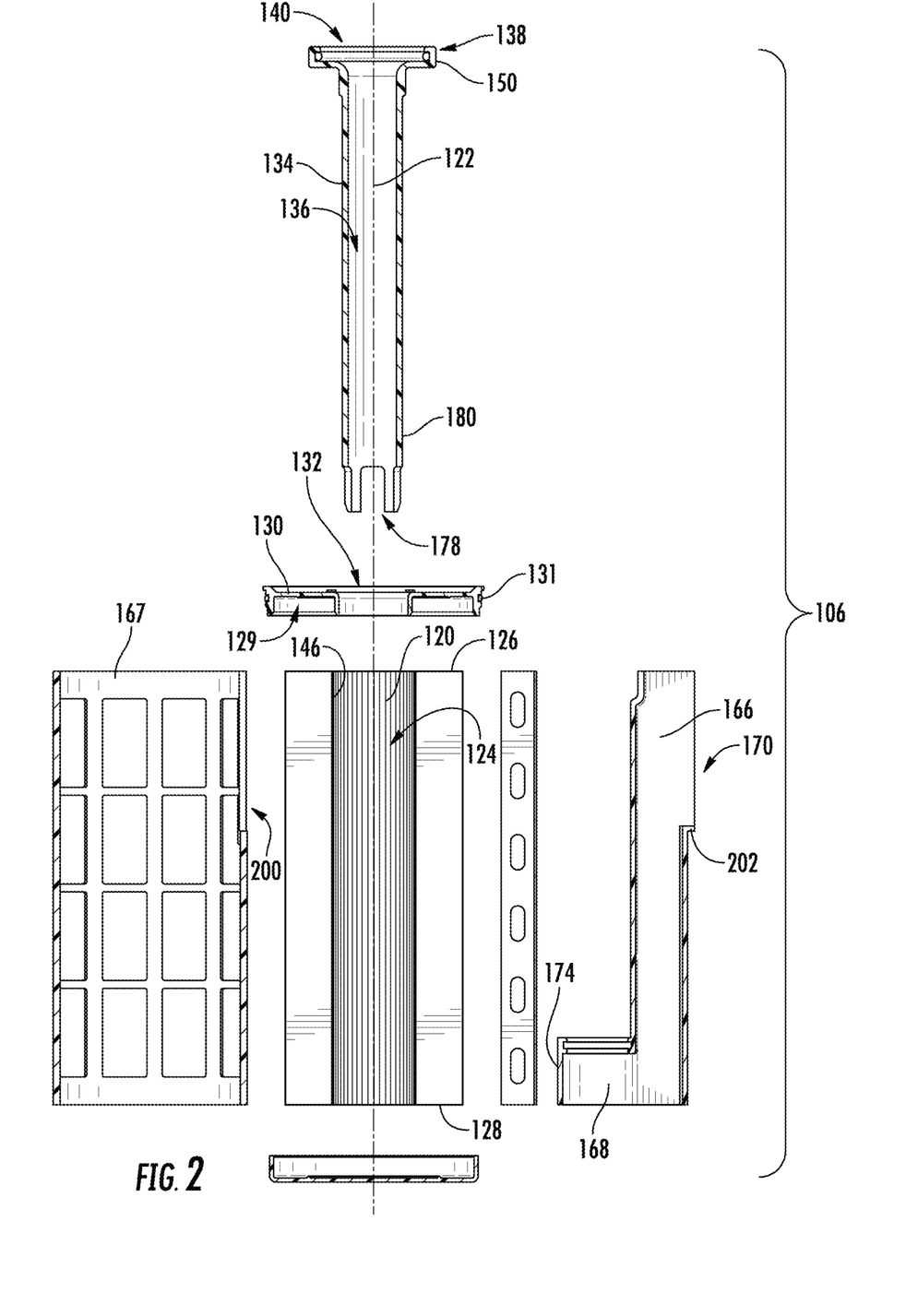
FIG. 2 is an exploded cross-sectional illustration of a filter element used in the filter system of FIG. 1.

With additional reference to FIG. 2, filter element 106 includes a tube of filter media 120 that extends around central axis 122 to form a central chamber 124. The tube of filter media 120 extends axially along the central axis 122 between a top end 126 and a bottom end 128.

A top end cap 130 is secured to the top end 126. This may be done by way of adhesive, welding the tube of filter media 120 to the top end cap 130, embedding of the tube of filter media 120 into the top end cap 130 or other known means. In this example, the top end cap 130 forms an annular well 129 that receives the top end 126 and an adhesive such as a potting material to secure the tube of filter media 120 to the top end cap 130. Further, the potting material may also seal the top end 126 of the tube of filter media 120, such as if the tube of filter media 120 is formed from pleated filter media.

The top end cap 130 carries a housing seal illustrated in the form of o-ring 131 that seals the filter element 106 within the filter housing 104 and particularly an outer region of the top end cap 130. Other sealing arrangements are contemplated.

The top end cap 130 includes a first opening 132 extending therethrough. As such, when the top end cap 130 is secured to the tube of filter media 120, access to the central chamber 124 of the tube of filter media 120 is permissible through the top end cap 130.

A standpipe 134 extends into the central chamber 124 of the tube of filter media 120. The standpipe 134 is generally tubular and defines a standpipe flow path 136.

A first end 138 of the standpipe 134 defines a standpipe port 140. As illustrated in FIG. 1, the standpipe port 140 sealingly engages the inner annular wall 114 to sealingly connect the standpipe 134 and the standpipe flow path 136 with the clean fluid outlet 110. A gasket such as o-ring 141 may be used to seal the standpipe 134 to the inner annular wall 114. In this example, the standpipe port 140 engages an outer surface of the inner annular wall 114, but it could engage an inner surface depending on the configuration.

In this example, the standpipe port 140 has a diameter that is larger than the diameter of the opening 132 of the top end cap 130.

The standpipe 134 extends into the central chamber 124 defined by the inner periphery 146 of the tube of filter media 120.

In this example, the stand pipe 134 extends axially through the central opening 132 and axially out of the tube of filter media 120. The standpipe 134 is sized and configured to provide a clearance between an outer periphery thereof and the top end cap 130. This clearance provides a fluid chamber port 142 that provides fluid communication to the central chamber 124 and particularly a fluid chamber 144 formed between inner periphery 146 of the tube of filter media 120 and an outer periphery 148 of the standpipe 134. Fluid chamber 144 is part of central chamber 124. Notably, the clearance need not be entirely around the standpipe. Instead, one or more clearance channels may be formed if the standpipe 134 contacts the top end cap 130 in various locations.

The fluid chamber port 142 is operably sealingly communicated with the dirty fluid inlet 108. This is done by seals between the standpipe 134 and the inner annular wall 114 and the end cap 130 and the housing 104. In this embodiment, this is accomplished, at least in part, by o-ring 141 and o-ring 131. However, other sealing arrangements are contemplated as long as fluid bypass or leakage is not permitted.

The standpipe 134 in this example has an enlarged head portion 150 at the first end 138 that has an outer diameter that is greater than the inner diameter of the first opening 132 through the top end cap 130. The enlarged head portion 150 thus extends radially outward in overlap with a portion of the top end cap 130. Further, enlarged head portion 150 is axially outward from the filter media 120 as compared to the adjacent portion of the top end cap 130. This causes the fluid chamber port 142 to direct dirty fluid radially inward towards central axis 122 in operation.

However, other configurations are contemplated, e.g. where head portion 150 is not larger in diameter than first opening 132. Further, a radially outward directed seal could be provided as compared to the radially inward directed seal in the current example.

A bottom end cap 154 is attached to the bottom end 128 of the tube of filter media 120. In this example, the bottom end cap 154 is a closed end cap and free of any apertures therethrough. The bottom end cap 154 can be secured to the bottom end 128 in the same way as the top end cap 130 (e.g. adhesive, welding, embedding, etc.).

In a preferred example, adhesive, e.g. potting material, secures the bottom end cap 154 to the tube of filter media 120. The potting material can also be used to secure a second end 156 of the standpipe 134 to the bottom end cap 154 and consequently the rest of the filter element 106, e.g. the top end cap 130 and the tube of filter media 120.

The bottom end cap 154 also closes off the bottom end 128 of the central chamber 124. Further, in some examples, the bottom end cap 154 and/or any adhesive closes any pleats if the filter media is pleated filter media.

In the current arrangement of the filter system 100, dirty fluid 109 flows into central chamber 124 into the fluid chamber 144 formed radially outward of standpipe 134 and then flows radially outward through the tube of filter media 120 to remove particulates. Further, the tube of filter media 120 is configured to cause coalescing of entrained water, illustrated by droplets 160. These droplets 160 are formed exteriorly of the tube of filter media 120.

The clean fluid 111 and droplets 160 are located in a second fluid chamber 162 formed between the exterior of the filter element 106 and an interior surface of the filter housing 104. The droplets 160 are sized such that they will flow downward toward a water collection region 164 of the filter system 100. The water collection region 164 may be a water collection bowl, sump or other region for collection of the coalesced water.

A stripper 165 (FIG. 1) may be included to help strip the coalesced water droplets 160 from the flow of clean fluid 111. The stripper may be attached to an outer periphery of support frame 167.

Because the clean fluid outlet 110 and inner annular wall 114 associated therewith are generally centered on axis 122, the clean fluid must get back to the central axis 122 from the second fluid chamber 162 (i.e. external of the filter element) without mixing with the incoming dirty fluid 108.

To allow for this, a radially directed flow path from the second fluid chamber 162 to standpipe 134 and particularly the standpipe flow path 136 is provided.

An axial flow tube 166 and a radial flow conduit 168 provide this flow path. In this embodiment, at least a portion of the axial flow tube 166 and at least a portion of the radial flow conduit 168 are formed as a single continuous body of material.

In one example, the axial flow tube 166 and radial flow conduit 168 are formed from molded material, such as molded plastic.

The axial flow tube 166 has an inlet port 170 in which cleaned fluid 111 within the second fluid chamber 162 enters the axial flow tube 166 and a flow tube flow path 172 provided thereby.

To reduce inadvertently drawing coalesced water droplets 160 or other separated water into the inlet port 170, the inlet port 170 is preferably closer to the top end cap 130 than the bottom end cap 154. More particularly, as the water droplets 160 flow downward towards the bottom end cap 154, the concentration of water is typically greater closer to the bottom end cap 154 than the top end cap 130. However, other examples are contemplated to have the inlet port 170 closer to the bottom end cap 154 than the top end cap 130.

Figure 3:
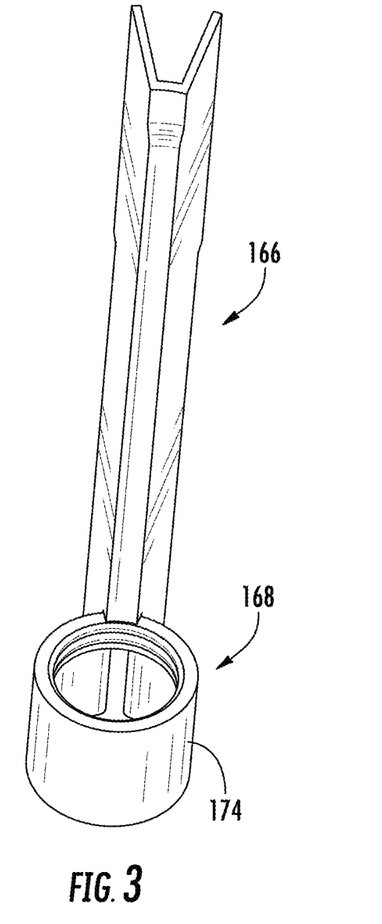
FIGS. 3 and 4 are perspective illustrations of axial flow tubes of the filter element of FIG. 2.
Figure 4:
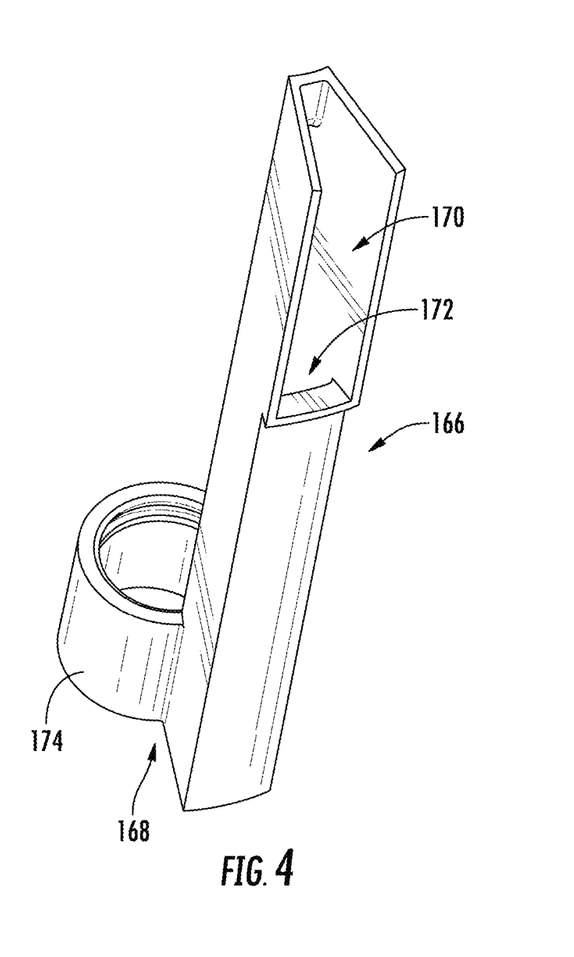

In the illustrated example, the radial flow conduit 168 includes an annular collar 174 (see e.g. FIGS. 3 and 4). The second end 156 of the standpipe 134 is axially received into the annular collar 174.

An o-ring 176 seals the radial flow conduit 168 to the standpipe 134. In this example, the stand pipe 134 includes a plurality of ports 178 in the sidewall 180 of the standpipe 134 that provides fluid communication between the radial flow conduit 168 and the standpipe flow path 136.

Thus, the radial flow conduit 168 allows for radially inward directed flow from the exterior of the tube of filter media 120 to the standpipe flow path 136 that is positioned within the central chamber 124 formed by the tube of filter media 120.

While the body that forms the axial flow tube 166 and radial flow conduit 168 is a separate component than standpipe 134, it is contemplated that in other examples these components could all be formed in a single body. It is also contemplated that the radial flow conduit 168 could be formed from its own independent body. It is further contemplated that the axial flow tube 166, radial flow conduit 168 and standpipe 134 could be formed from a single continuous body, e.g. molded or machined as a single component.

In this example, the bottom end cap 154 closes off or otherwise forms part of the flow path formed, at least in part, by the axial flow tube 166, the radial flow conduit 168 and the standpipe 134.

In this configuration, clean fluid 111 that is external to the tube of filter media but within the axial flow tube 166 120 flows axially away from the top end cap 130 and towards the second end cap 154. The clean fluid 111 flows radially inward through the radial flow conduit 168 and then axially towards, and ultimately through, the top end cap 130 within the standpipe 134.

In many instances, this filter head 102 would have been used with a radially inward directed flow filter element. In such an arrangement, water removal would have occurred using a water stripping technique where water is removed from the dirty fluid flow prior to the dirty fluid flowing through filter media of the filter element. However, if a coalescing element were used, the removed coalesced water would undesirably end up on the inside of the tube of filter media due to coalescing media having the removed water downstream of the media, rather than upstream.

The inclusion of the flow path defined by the axial flow tube 166, radial flow conduit 168 and standpipe 134 allow for such a filter head, as illustrated in FIG. 1, by allowing for a flow reversal through the filter media of the tube of filter media 120 of filter element 106.

In an example, the tube of filter media 120 is provided by pleated filter media.

Figure 5:
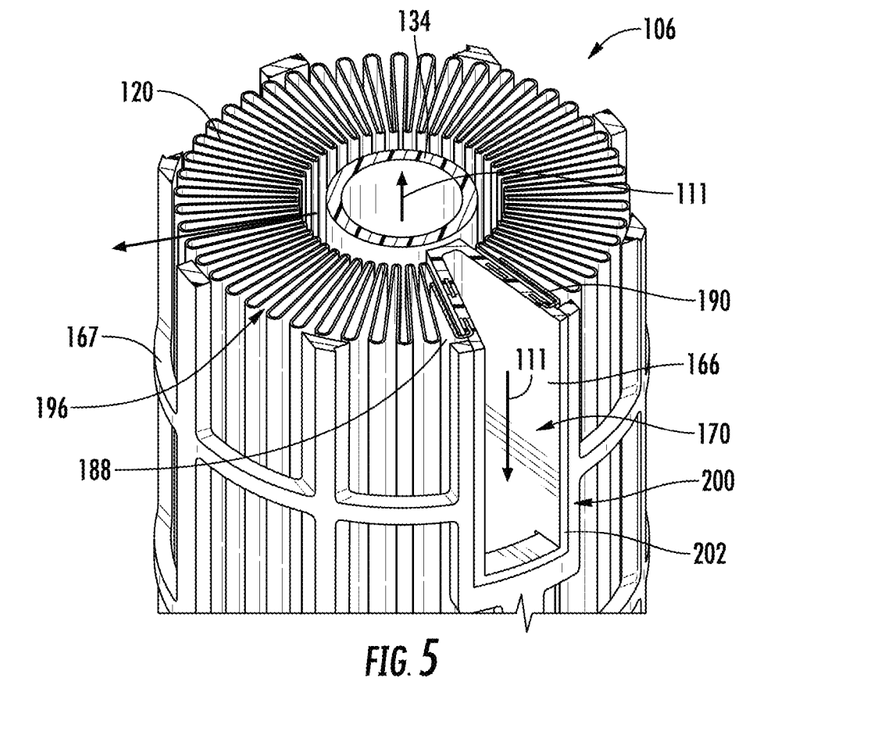
FIGS. 5 and 6 are perspective partial cross-sectional illustrations of the filter element of the filter system of FIG. 1.
Figure 6:
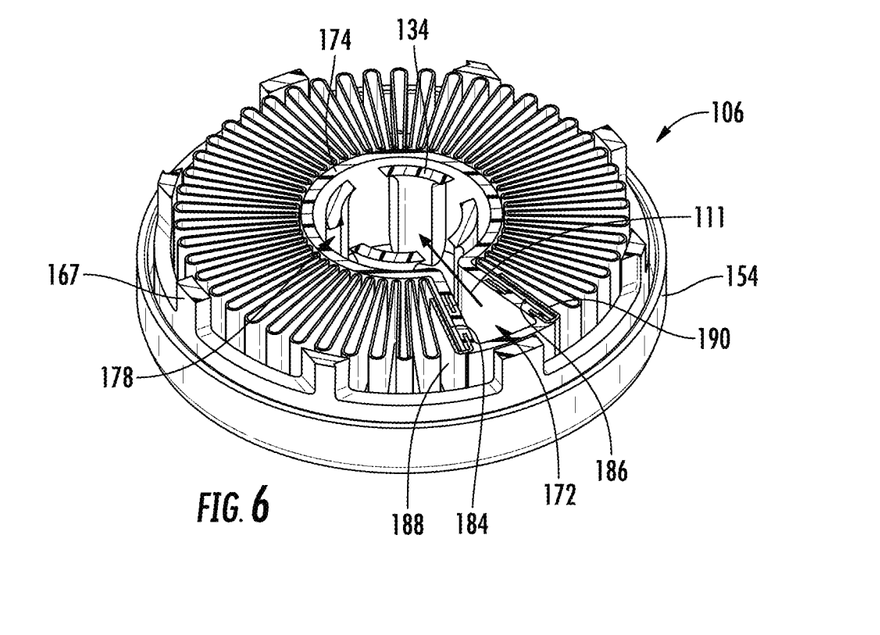
Figure 7:
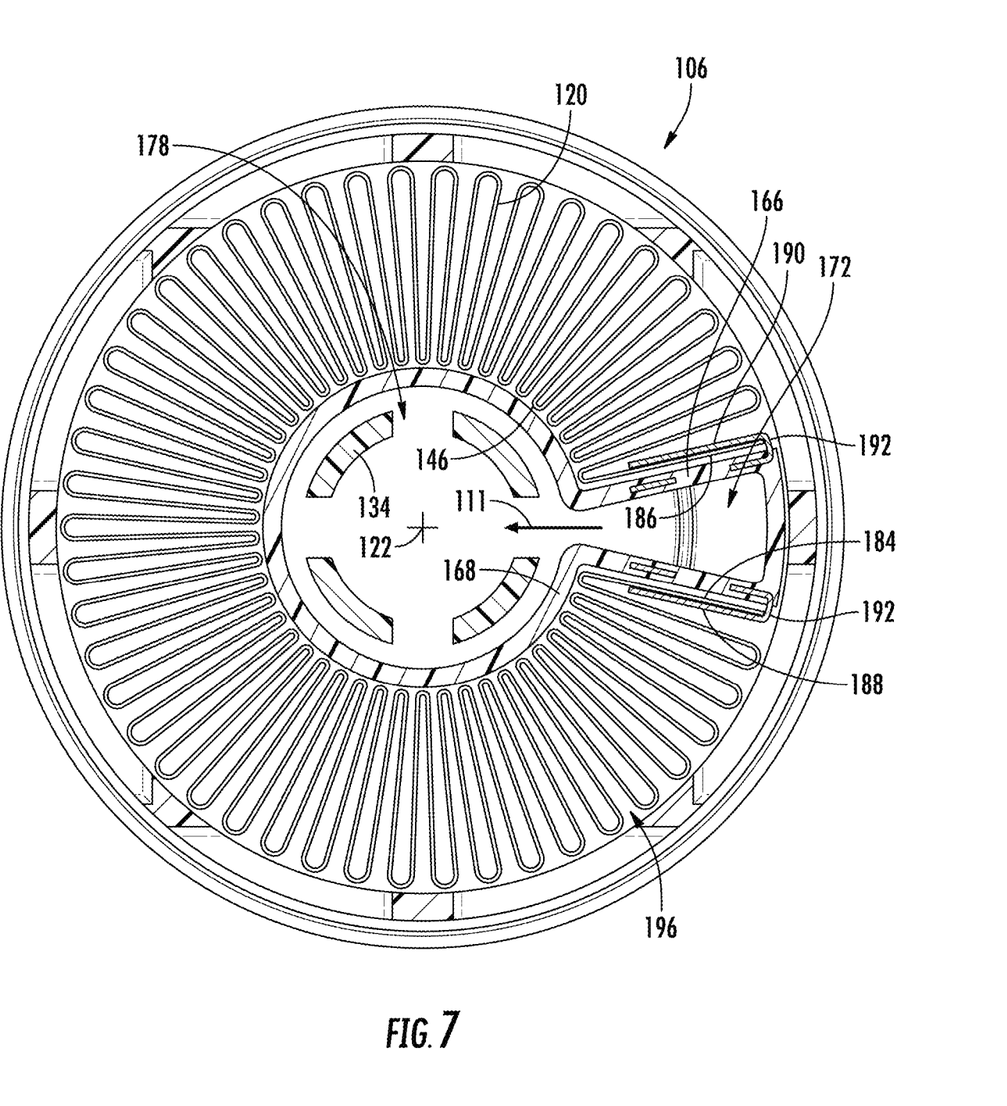
FIG. 7 is a further cross-sectional illustration of the filter element of the filter system of FIG. 1.

With reference to FIGS. 5-7, the axial flow tube 166 is located angularly between opposed sides 184, 186 of the tube of filter media 120. Typically, the tube of filter media 120 is formed from a flat section of filter media that is folded around central axis 122. If pleated media is used, the folds would be oriented generally vertically/parallel to central axis 122. The folds could be at a slight angle to central axis 122 if the filter element 106 was frustoconical in shape, but the folds would typically extend more parallel to axis 122 than perpendicular thereto.

The axial flow tube 166 is generally wedge shaped in cross-section in a plane orthogonal to central axis 122. As best illustrated in FIG. 7, the axial flow tube 166 tapers such that the cross-section gets wider when moving radially outward away from central axis 122.

The axial flow tube 166 is sealed to opposed sides 184, 186 of the filter media forming the tube of filter media 120. In view of FIG. 7, the tube of filter media 120 need not extend a complete 360 degrees about central axis 122.

To secure the opposed sides 184, 186 to opposed sides of the axial flow tube 166, first and second clips 188, 190 are provided that clip portions of the tube of filter media 120 to the axial flow tube 166. In this example, the clips 188, 190 are folded over one or more pleat panels of the tube of filter media 120 proximate the opposed sides 184, 186 of the tube of filter media.

An adhesive may be provided in the alternative or in combination with the clips 188, 190 to help seal the filter media to the axial flow tube 166. In some embodiments, the filter media may be welded to the body of the axial flow tube 166, such as by heat or ultrasonic welding.

In this example, clips 188, 190 are flexible metal components that have a first leg that is embedded in the body forming axial flow tube 166 and a second leg exterior of the axial flow tube 166 that is folded at bend 192 to pinch the portion of the filter media against adjacent sides of the axial flow tube 166.

In one example, the clips 188, 190 are molded into the axial flow tube 166.

In other examples, the clips 188, 190 could be flange portions integrally formed with the axial flow tube 166.

In some examples, a combination of one or more of welding, adhesives, mechanical clips, etc. may be used to secure and/or seal the opposed sides 184, 186 of the tube of filter media to the axial flow tube 166.

Further yet, in some embodiments, the tube of filter media 120 may extend entirely around the central axis 122 and the axial flow tube 166 is located between adjacent pleat panels, but fluidly exterior of the tube of filter media 120.

When pleated media is used to form the tube of filter media 120, adjacent pleat panels form voids 196 therebetween on the external side of the tube of filter media 120. In an example, a cross-sectional area of the flow tube flow path 172 when viewed orthogonal to the central axis is greater than a cross-sectional area of the voids 196 when viewed orthogonal to the central axis.

In examples, the cross-sectional area of the flow tube flow path 172 may be at least one and a half times, at least two times, at least two and a half times and at least three times the area of voids 196.

The support frame 167 surrounds the tube of filter media 120 and provides radial support thereto as well as axial strength to the filter element 106. In one example, the support frame 167 is preformed prior to assembly of the filter element 106.

Figure 8:
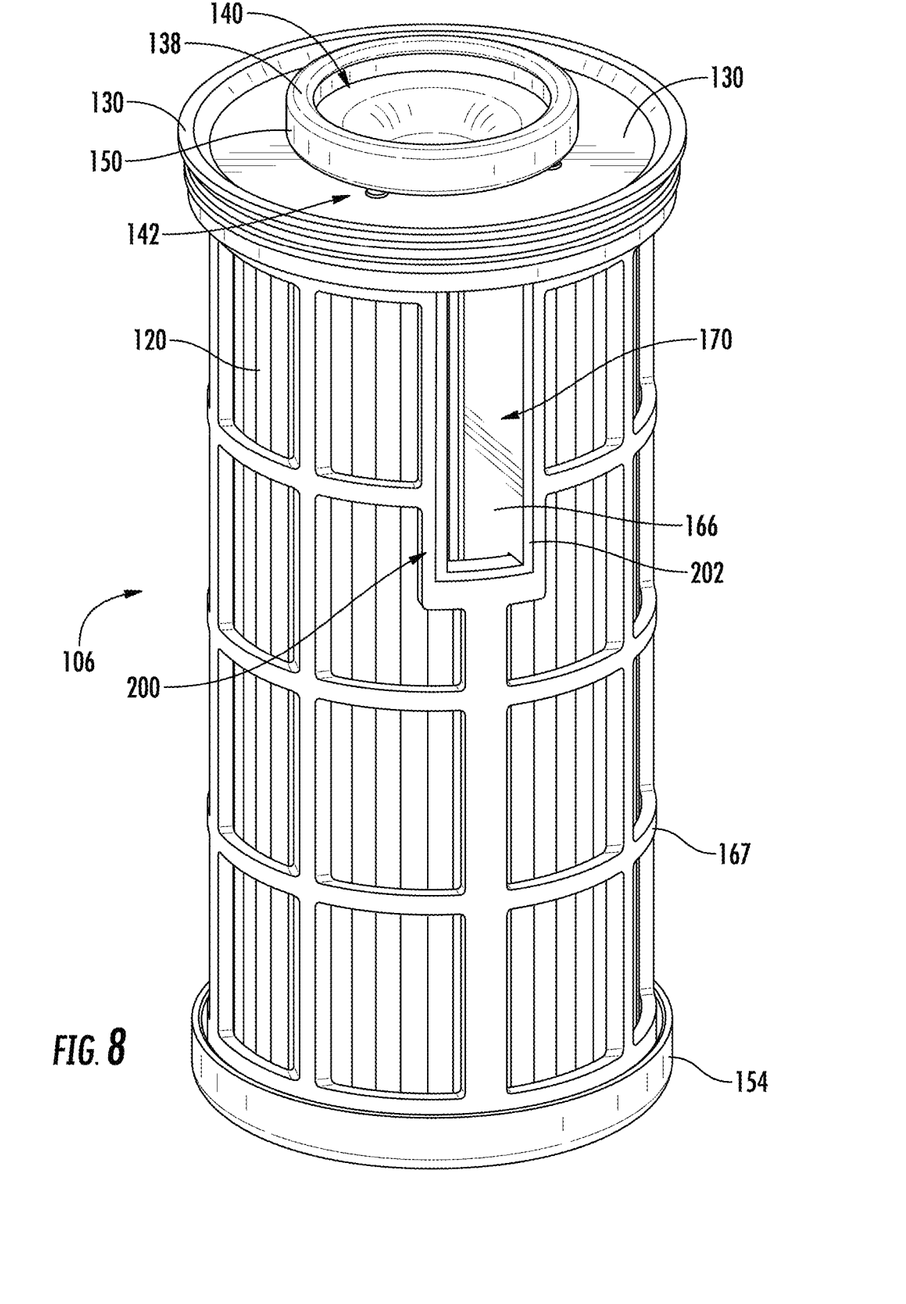
FIG. 8 is a perspective illustration of the filter element of the filter system of FIG. 1.

With reference to FIG. 8, the support frame 167 is keyed to the axial flow tube 166. More particularly, the support frame 167 includes a rectangular window 200 that is sized and configured to mate with a corresponding rectangular portion 202 of the axial flow tube 166. Notably, the window 200 and rectangular portion 202 need not include a portion proximate top end 126 of the tube of filter media 120. This mating relationship can assist in assembly of the filter element by allowing for proper location of the relative components.

While not illustrated, in some embodiments, a stripping element can extend across the rectangular portion 202 of the axial flow tube 166 to further prevent water from entering into the axial flow tube 166.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A filter element comprising:
a tube of filter media circumscribing a central axis and defining a central chamber, the tube of filter media extending between a top end and a bottom end;
a top end cap secured to the top end of the tube of filter media having a first opening;
a bottom end cap secured to the bottom end of the tube of filter media;
a standpipe located within the tube of filter media defining a standpipe flow path having a standpipe port proximate the top end cap, a fluid chamber being formed between an exterior of the standpipe and an interior of the tube of filter media, the fluid chamber forming part of the central chamber, a fluid chamber port being defined between the top end cap and the standpipe;
an exterior axial flow tube having a first flow tube port positioned fluidly exteriorly of the central chamber, the axial flow tube defining a flow tube flow path extending from the first flow tube port axially towards the bottom end cap for fluid flow generally parallel to the central axis; and
a radial flow conduit defining a radial flow path radially fluidly connecting the flow tube flow path with the standpipe flow path at a location closer to the bottom end cap than the top end cap.

2. The filter element of claim 1, wherein the first flow tube port is positioned axially closer to the top end of the tube of filter media than the bottom end of the tube of filter media.

3. The filter element of claim 1, wherein a filter element flow path is defined from the fluid chamber port to the standpipe port, the filter element flow path extends from the fluid chamber port, into the fluid chamber, radially through the filter media to the exterior of the tube of filter media, into the first flow tube port, through the flow tube flow path towards the bottom end cap, radially through the radial flow path, into the standpipe flow path, axially towards the top end cap to the standpipe port.

4. The filter element of claim 1, wherein the stand pipe extends axially through the first opening of the top end cap such that the standpipe port is external of the central chamber of the tube of filter media and axially offset from the tube of filter media.

5. The filter element of claim 4, wherein the standpipe port has a standpipe port diameter that is larger than a first opening diameter of the first opening of the top end cap, such that fluid flowing from the fluid chamber port to the fluid chamber flows radially toward the central axis and fluid flowing from the fluid chamber toward the fluid chamber port flows radially away from the central axis.

6. The filter element of claim 1, wherein the tube of filter media comprises a ring of pleated filter media, the exterior axial flow tube is located between adjacent pleats of the tube of filter media.

7. The filter element of claim 1, wherein the tube of filter media generally comprises a section of pleated filter media folded around the central axis to form the tube of filter media such that opposed first and second sides of the section of pleated filter media are proximate one another, the axial flow tube being positioned angularly between the opposed first and second sides of the section of pleated filter media to form the tube of filter media.

8. The filter element of claim 7, wherein the first and second sides of the section of pleated filter media are secured to the axial flow tube.

9. The filter element of claim 8, wherein the axial flow tube includes first and second clips on opposed sides of the axial flow tube, the first clip engaging a first pleat panel of the pleated filter media proximate the first side of the section of filter media, the second clip engaging a second pleat panel of the pleated filter media proximate the second side of the section of filter media.

10. The filter element of claim 7, wherein the axial flow tube is an elongated wedge shape, tapering outwardly from a narrower radial inner end toward a broader radially outer end, the radially inner end closer to the central axis than the radially outer end.

11. The filter element of claim 9, wherein the axial flow tube has a molded body defining the flow tube flow path, the first and second clips having a portion embedded in the molded body and a tab portion extending outward from the molded body, the tab portion of each clip engaging the filter media.

12. The filter element of claim 1, wherein the bottom end cap is adhesively secured to the tube of filter media, the axial flow tube and the standpipe.

13. The filter element of claim 1, wherein:
the tube of filter media is formed from pleated filter media, adjacent pleat panels forming voids therebetween; and
a cross-sectional area of the flow tube flow path orthogonal to the central axis being greater than a cross-sectional area of the voids orthogonal to the central axis.

14. The filter element of claim 1, wherein the radial flow conduit and the axial flow tube are formed from a single continuous body and a seal member seals the radial flow conduit to the standpipe.

15. The filter element of claim 14, wherein the continuous body defining the radial flow conduit and the axial flow tube includes an annular member that extends around an outer periphery of the standpipe proximate the bottom end cap.

16. The filter element of claim 1, wherein the standpipe, radial flow conduit and the axial flow tube are formed from a single continuous body.

17. The filter element of claim 1, wherein the bottom end cap bounds, at least in part, the radial flow conduit as the radial flow conduit extends radially between the standpipe and the axial flow tube.

18. The filter element of claim 1, wherein fluid flow between an exterior of the tube of filter media and the standpipe does not pass through the filter media of the tube of filter media.

19. A filter system comprising:
a filter head defining a dirty fluid inlet and a clean fluid outlet, the filter head having a filter element mounting arrangement;
a filter element housing;
a filter element according to claim 1 located within the filter element housing;
the filter element and filter element housing being mounted to the filter head with the fluid chamber port fluidly connected to the dirty fluid inlet or the clean fluid outlet and the standpipe port fluidly connected to the other one of the clean fluid outlet or the dirty fluid inlet; and
the filter element housing and an exterior of the tube of filter media defining a second fluid chamber exterior of the tube of filter media in direct fluid communication with the axial first flow tube port.

20. The filter system of claim 19, wherein both dirty fluid flowing from the filter head flowing through the dirty fluid inlet and clean fluid flowing into the filter head from the filter element pass through the central opening in the filter element.

21. The filter system of claim 20, wherein dirty fluid within the central chamber of the tube of filter media is separated from clean fluid within the central chamber by the standpipe.

22. The filter system of claim 19, wherein the dirty fluid inlet is connected to the fluid chamber port upstream of the filter media and the clean fluid outlet is connected to the standpipe port downstream from the filter media such that dirty fluid flows into the fluid chamber prior to passing through the filter media and clean fluid flows into the standpipe after flowing through the second fluid chamber, axial flow tube, and the radial flow conduit.

23. A filter system comprising:
a filter head defining a first port and a second port, the filter head having a filter element mounting arrangement;
a filter element housing;
a filter element according to claim 6 located within the filter element housing;
the filter element and filter element housing being mounted to the filter head with the fluid chamber port fluidly connected to the first or second port and the standpipe port fluidly connected to the other one of the first or second port; and
the filter element housing and an exterior of the tube of filter media defining second fluid chamber exterior of the tube of filter media in direct fluid communication with the axial first flow tube port.

* * * * *